United States Patent [19]

Clarke

[11] 4,238,690
[45] Dec. 9, 1980

[54] AC-DC SWITCHING REGULATOR TO SUPPLY UNINTERRUPTIBLE POWER

[75] Inventor: Patrick W. Clarke, New Providence, N.J.

[73] Assignee: Bell Telephone Laboratories, Incorporated, Murray Hill, N.J.

[21] Appl. No.: 953,427

[22] Filed: Oct. 23, 1978

[51] Int. Cl.³ .............................................. H02J 9/00
[52] U.S. Cl. ...................................... 307/44; 307/66; 323/50; 323/22 T
[58] Field of Search ...................... 307/44, 45, 46, 64, 307/66, 70, 86; 363/97, 126, 90; 323/50

[56] References Cited

U.S. PATENT DOCUMENTS

| | | | |
|---|---|---|---|
| 3,246,229 | 4/1966 | Lloyd | 363/48 |
| 3,873,846 | 3/1975 | Morio | 307/66 |
| 4,030,015 | 6/1977 | Herko | 363/48 |
| 4,038,559 | 7/1977 | Chun et al. | 307/64 |

Primary Examiner—Michael L. Gellner
Assistant Examiner—S. D. Schreyer
Attorney, Agent, or Firm—Alfred G. Steinmetz

[57] ABSTRACT

An uninterruptible power supply utilizes a switching circuit which under normal operation modulates at a high frequency a signal provided by a commercial AC line to control the energy flow through a transformer between an input accepting the AC line source and a rectified DC output. The switching circuit which performs the modulation is optimally arranged to be coupled to a reserve energy source such as a charge storage capacitor or battery. It operates upon failure of the AC signal input to provide energy from the reserve source to the load by operating as a switching regulator.

10 Claims, 1 Drawing Figure

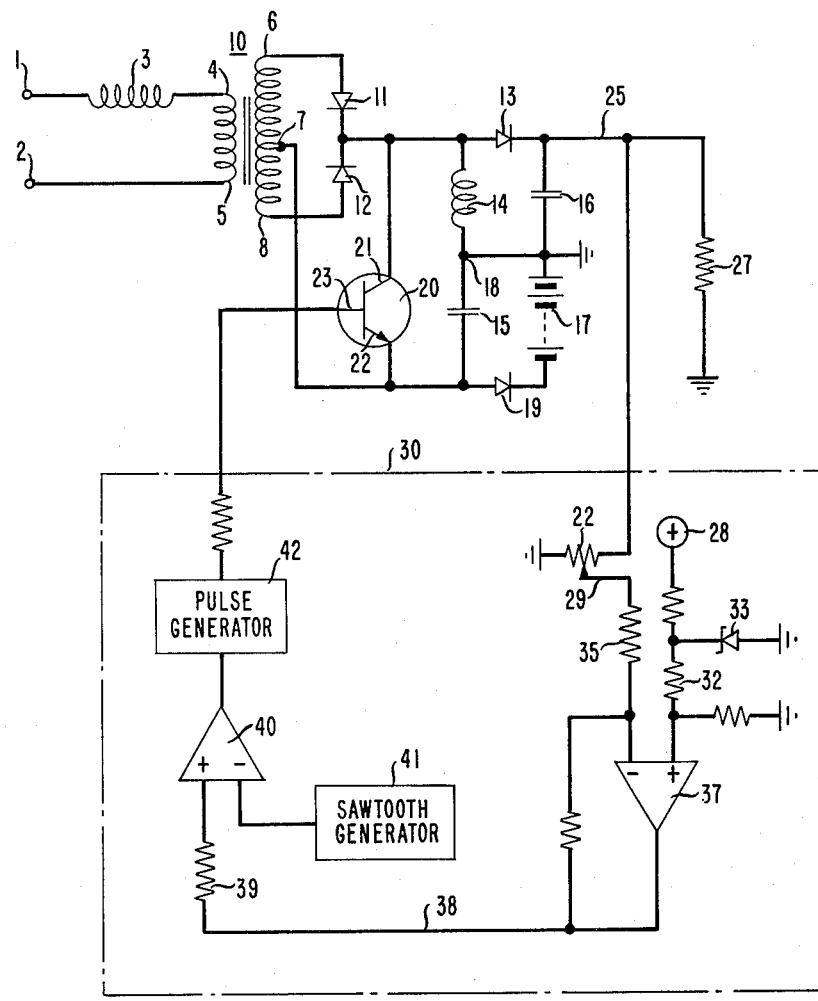

AC-DC SWITCHING REGULATOR TO SUPPLY UNINTERRUPTIBLE POWER

TECHNICAL FIELD

This invention relates to uninterruptible power supply systems having plural power sources which normally include a primary power source and a reserve power source. It is specifically concerned with a power flow control system to control the flow of power from plural, independent power sources to an output load to be energized.

DESCRIPTION OF THE PRIOR ART

Modern electronic circuits, such as computers, data processors, and communication equipment, require extremely reliable power sources. While commercial power is normally utilized as the basic source for these circuits, it is frequently subject to outages or even more frequently to magnitude and phase instabilities, causing irregular voltage waveforms due to transients induced by the action of various other customers connected to the system. Computers and like circuits require precisely regulated, continuous power signals and cannot tolerate the fluctuations which frequently occur with a commercial power source. Hence, to assure a safe, reliable operation of computer circuits and the like, a source of continuous, regulated power having very stable characteristics is needed. This need is met generally through the use of uninterruptible power supplies which include plural sources of power and which usually operate in conjunction with each other to provide a continuous power output to some load to be energized.

A suitable power supply for computer-type circuits is disclosed in U.S. Pat. No. 4,038,559, issued to P. S. Chun et al on July 26, 1977, and assigned to the same assignee as this application. Disclosed therein is an uninterruptible power supply system utilizing a highly reactive linear transformer which has two input windings and a single output winding. One input winding is connected to a commercial AC power line and the other input winding is connected to a gating circuit which operates to control the flow of power from the AC line to a load connected to the output winding. The gating circuit is connected to a second, or reserve, power source and is configured to supply power to the load to supplement or replace the commercial AC power. The flow of power from the commercial AC line to the load is controlled by utilizing a gating circuit to control periodic power transmission intervals through the transformer. This controlled power transmission interval is a form of pulse width modulation control. If the commercial AC power fails, the gating circuit operates in a converter mode to supply a controlled power output from the reserve power source to the load. It additionally operates to supplement the power supplied by the commercial AC if the AC power is suffering a brownout condition where its power is attenuated below its normal value.

The frequency of operation of the gate is normally selected to be significantly higher than the frequency of the commercial AC power. Commercial AC power is normally a 60 Hz signal while the gates may be operated in the kilohertz range. Hence, the transformer coupling the power from both inputs to the output must be designed to accommodate signals from approximately 60 Hz from one input winding and signals in the kilohertz range at the other input winding. Hence, the transformer must be carefully designed to accommodate a wide range of signal frequencies. A lower signal frequency supplied by the gating circuit simplifies transformer design somewhat but introduces audible noise to those within hearing range of the power supply circuit. The noise problem may be controlled by increasing the frequency of the gating circuit; however, this complicates the transformer design. The transformer is further complicated by the two input windings which require a transformer design that loosely couples the input windings while providing the necessary close coupling between each of the input windings and the output winding.

SUMMARY OF THE INVENTION

Therefore, in accord with the invention, very efficient use of a power supply transformer in an uninterruptible power supply is achieved by utilizing an auxiliary gating circuit which operates to modulate power flow supplied by a primary periodic power source through the transformer and, at the same time, the gating circuit operates upon failure of the primary power source to supply auxiliary power to an output load without routing the auxiliary power through the transformer. This advantageously limits the use of a transformer to couple power at a single frequency; and the gating circuit, which derives a periodic power signal from the reserve power source, may be operated at a very high frequency to eliminate audible noise which is caused by switching of the switching device used for gating at lower frequencies.

In a particular embodiment of an uninterruptible power supply embodying the principles of the invention, a switching circuit is utilized and operates under normal conditions to high frequency modulate a signal provided by a commercial AC line to control the energy flow through a transformer between an input accepting the AC line source and a rectified DC output. The gating circuit performs modulation of the primary power signal by utilizing the principle of conservation of magnetic flux linkages. It utilizes this principle by periodically shorting an active portion of a secondary winding of the transformer so that the magnetic linkages will remain constant for the duration of the shorting and the transformer will be unable to transmit signals. The switching circuit which performs the modulation is optimally arranged to be connected to a second reserve energy source such as a charge capacitor and a battery voltage source coupled thereto. It operates upon failure of the AC signal input to provide energy to the load by operating as a switching regulator.

BRIEF DESCRIPTION OF THE DRAWING

An understanding of the invention may be obtained from the specification below describing an illustrative embodiment embodying the principles of the invention and the accompanying drawing in which the sole FIGURE discloses a schematic of an uninterruptible power supply utilizing the power flow control techniques embodied in the principles of the invention.

DETAILED DESCRIPTION

An uninterruptible power supply in which power supplied to an output load may be derived from either a commercial AC power signal or a DC voltage source is shown schematically in the FIGURE. The power flow from either power source is controlled by a master power switch, shown therein as transistor switch 20, which operates in one mode to modulate AC power flowing to the load 27 through the transformer 10 and operates in another mode as a switching regulator to derive regulated power output from a battery voltage source 17.

Advantageously the selected frequency at which the switch 20 is driven is completely independent of the frequency of the commercial AC power applied to the power supply. Additionally, it is independent of transformer design considerations since no power at the frequency at which the switch 20 is driven is required to pass through the transformer. Hence, a switch frequency may be selected at will to adapt to other circuit and environmental considerations. For example, a frequency above the audible frequency range may be selected to eliminate troublesome noise in the environment of the power supply.

In the circuit schematic shown, commercial AC power is applied to the input terminals 1 and 2 and is coupled through a linear inductor 3 to a primary winding 4–5 of a power supply transformer 10. The reactance of the linear inductor 3 is selected to present a very low impedance to signals at the AC line frequency and a high impedance to high frequency signals generated by the high frequency switching of the switch 20. This advantageously prohibits the accidental coupling of any power generated in response to the switching of the transistor 20 from flowing back through the transformer to the AC power line.

The commercial AC power signal is coupled by transformer 10 to the two output windings 6–7 and 7–8 which are connected, respectively, to the rectifying diodes 11 and 12. In accordance with the well-known operation of rectifiers, the rectifiers 11 and 12 alternately conduct in response to signals induced in the secondary windings 6–7 and 7–8, and the rectified power is coupled, via diode 13, to the output load 27 which, while shown as a resistive load, may include reactive components.

The amount of power transmitted through transformer 10 is controlled by the modulating action of the transistor switch 20 which is operated in response to the control circuit 30. The control circuit 30, includes a sensing resistor 22 coupled to the output lead 25, and operates in response to the voltage sensed thereat to operate transistor switch 20 for controlled conduction intervals at a high frequency to modulate power flowing through transformer 10 in order to maintain a constant output voltage across the output load 27.

As can be seen from the FIGURE, the transistor switch 20 has its emitter 22 coupled to the common node 7 of output secondary windings 6–7 and 7–8 and its collector 21 coupled to the common junction of the cathode of the rectifying diodes 11 and 12 so that if its main conduction path is saturated, the secondary winding connected to a conducting rectifying diode is shorted. By shorting the secondary windings through the active rectifying diode, the saturated transistor switch 20 completes a closed circuit path of negligible resistance. As long as this circuit path is closed and the resistance is negligible, the magnetic linkages in the transformer 10 cannot change and hence no power can flow through the transformer 10. It is recognized that the closed circuit path described does contain a negligible resistance and that the linkages in the transformer 10 must decrease at a rate just sufficient to generate the small IR drops in the circuit path. However, this change is negligible and for all practical purposes no power supplied by the AC commercial source can flow through the transformer 10 when the transistor switch 20 is in a saturated conducting condition. Energy is stored in the linear inductor 3 when energy flow through the transformer 10 is disabled. This energy is delivered to the output as soon as transition switch 20 is biased nonconducting.

Transistor switch 20 is switched in response to the feedback control circuit 30 which responds to the output voltage detected across resistor 22. The basic frequency at which transistor 20 is switched is responsive to a sawtooth generator 41 contained within the feedback control circuit. This frequency may be set at any predetermined value although generally a high frequency is selected. The high frequency switching is utilized to modulate the flow of energy through the transformer 10.

This frequency selected is not in any way constrained by the frequencies of the commercial AC signal applied to input terminals 1 and 2. It is noted that the input and output signals of an inductively coupled transfer power coupling medium must be coherent. This coherency is not affected by the high frequency of the sampling switch inasmuch as the coherency is derived at the output signal through action of the rectifying diodes 11 and 12. Hence the input current and the output voltage are always in a consistent phase relationship.

A portion of the output voltage is sensed by wiper arm 29 which is slidably connected to resistor 22 shunted across an output filter capacitor 16. This representative voltage is applied, via a resistor 35, to the inverting input of a comparator operational amplifier 37. A reference voltage derived from the voltage source 28 and zener diode 33 is applied, via resistor 32, to the noninverting input of a comparator operational amplifier 37. The error voltage derived from resistor 28 is applied via resistor 35 to the inverting input. As this voltage increases in magnitude, the output voltage of the comparator operational amplifier 37 correspondingly decreases and the opposite effect occurs when the error voltage decreases. There is an inverse relationship between the error voltage and the output voltage level of operational amplifier 37.

The output voltage level of operational amplifier 37 is applied, via lead 38 and resistor 39, to the noninverting input of the comparator operational amplifier 40. A sawtooth waveform output of sawtooth generator 41 is applied to the inverting input of operational amplifier 40. Operational amplifier 40 operates in a heavily biased binary mode. When the voltage magnitude of the sawtooth waveform equals or exceeds the voltage output of the operational amplifier 37 applied to the noninverting input of operational amplifier 40, a high signal state is generated at the output of operational amplifier 40. If the sawtooth waveform is less than the voltage output of operational amplifier, a low signal state output is generated.

These signal states are applied to a pulse generator 42 to generate a bias pulse to control the switching or biasing of the switching transistor 20. Pulse generator 42 generates a bias pulse to drive transistor 20 into saturation. This bias pulse has a time interval determined by the duration of the high signal state output of operational amplifier 40. Hence, it may be seen from the foregoing description that the output of the pulse generator 42 is a pulse signal having a modulated width whose duration is inversely proportional to the output voltage of the power supply. As the magnitude of the output voltage decreases, the duration of this pulse increases. This modulated pulse drives the switching transistor 20 into a modulated saturated conduction period which in turn modulates power flow through the transformer 10 to the output load 27 in order to maintain the output voltage at load 27 at a regulated value.

As discussed hereinabove, should the commercial AC power fail, or suffer a brownout, the transistor switch 20 acts to modulate or invert a reserve DC voltage source in order to generate a regulated output signal to maintain the voltage at the load 27 in an uninterrupted condition. Upon the failure of commercial AC power, no power is supplied via the rectifying diodes 11 and 12 to the output load 27. However, the feedback control circuit 30 continues to generate modulating pulses in the same fashion described hereinabove in order to invert the reserve DC voltage source 17.

The collector 21 of transistor switch 20 is connected to an inductor 14 and its emitter 22 is connected to a capacitor 15. The opposite terminals of inductor 14 and capacitor 15 are grounded at their common node 18. Collector 21 is also connected, via diode 13, to an output filter capacitor 16 which in turn is coupled, via output lead 25, to the load 27. Energy is supplied to the charge storage capacitor 15 by the reverse voltage or battery source 17. A continuous path is established to charge capacitor 15 from the reverse voltage source 17 through the diode 19. This charging occurs during periods when the transistor switch 20 is in a nonconducting or cutoff condition. Once transistor 20 is biased into its saturated conducting condition, the charge accumulated on capacitor 15 is applied, via transistor 20, to the inductor 14. A current flows through inductor 14 establishing a flux level in its core. When transistor 20 is subsequently biased nonconducting by the feedback control 30, stored energy in inductor 14 causes a current flow from inductor 14, via diode 13, to charge the output filter capacitor 16. The voltage across capacitor 16 is coupled to the output lead 25 and, in combination with the battery voltage of battery 17, maintains a regulated voltage across the output load 27.

It is apparent from the foregoing description that the switch 20 acts as a modulator to modulate power flow through the transformer 10 to the load 27 when the commercial AC power is acting normally. Should the commercial AC power suffer a brownout or fail completely, energy is extracted from the voltage source 17 through the switching operation of transistor 20 which, in combination with the inductor 14, operates in a switching regulator type mode to generate a regulated output voltage derived from the reserve power source 17.

I claim:

1. In an uninterruptible power supply:
   a power coupling medium having a first input to accept a periodic signal source;
   a rectifier coupled to rectify signals transmitted by the power coupling medium;
   said uninterruptible power supply characterized by
   a switching device coupled to the rectifier and to an output of the power coupling medium and operative to disable the power coupling medium;
   said switching device being further coupled to a second input to accept a nonperiodic signal source and operative to invert the nonperiodic signal source at the second input upon diminution of the periodic signal source.

2. An uninterruptible power supply as defined in claim 1 being further characterized by
   a capacitive storage device coupled to the second input via a steering diode to direct current flow, and
   an inductive storage device coupled via the switching device to accept energy from the capacitive storage device, the inductive storage device being coupled via a second steering diode to an output terminal of the power supply.

3. An uninterruptible power supply as defined in claim 2 being further characterized by
   a control circuit to drive said switching device and including a frequency source having a frequency at least an order of magnitude greater than a frequency of the periodic signal source.

4. An uninterruptible power supply as defined in claim 3 being further characterized in that
   the control circuit includes first comparator means coupled to an output of the power supply and operative to generate an error signal, and
   a second comparator responsive to the error signal and a sawtooth wave output of the frequency source and operative to generate a width modulated pulse utilized to drive the switching device.

5. A power supply circuit comprising:
   an inductive power coupling medium including an input winding to accept an AC power signal and an output winding;
   a rectifier coupled to the output winding;
   a switch coupled to shunt at least a portion of the output winding and a diode of the rectifier permitting it to short a signal flow through an active portion of the output winding by completing a closed circuit path through an active rectifying diode;
   an input terminal to accept a reserve voltage source coupled to a first terminal of the switch;
   an energy storage inductor coupled to a second terminal of the switch and further coupled to an output terminal of the power supply through a diode, whereby periodic operation of the switch periodically disables the power coupling medium and is further operative to invert power supplied by the reserve voltage source.

6. A power supply circuit as defined in claim 5 and further including
   a control circuit to drive the switch, said control circuit including a high frequency source to generate a sawtooth waveform at a frequency greater than the frequency of the AC power signal, and
   a comparator responsive to deviation of an output of the power supply circuit to generate an error signal, and
   a second comparator responsive to the error signal and the sawtooth waveform to generate a width modulated drive signal.

7. A power supply circuit as defined in claim 5 and further including
   a charge storage capacitor connected to the reserve voltage source via a battery diode to permit charging of the capacitor in one direction only.

8. An uninterruptible power supply comprising:
   an inductive power coupling medium including input means and output means;

the input means adapted to receive an AC power signal;

rectifying means coupled to the output means; and switch means connected to shunt at least a portion of the output means and the rectifying means and functioning to render the power coupling medium periodically inoperative;

said switch means being driven at a frequency substantially higher than the frequency of an AC power signal applied to the input means, and operative to disable any flow of a power signal through the power coupling medium; and means to accept an auxiliary DC power source and said switch means being further coupled to invert a DC signal applied to said means to accept an auxiliary power source in order to supply energy to said output means.

9. An uninterruptible power supply as defined in claim 8 and further including an energy storage inductor coupled to store energy from the auxiliary power source in response to switching of said switch means and further coupled to deliver energy to an output of said uninterruptible power supply.

10. An uninterruptible power supply as defined in claim 8 and further including a control circuit to drive said switching means comprising:

first comparator means responsive to an output signal to generate an error signal;

a high frequency sawtooth waveform generator and second comparator means to generate a width modulated drive signal in response to the high frequency sawtooth generator and the error signal of the first comparator.

\* \* \* \* \*

UNITED STATES PATENT AND TRADEMARK OFFICE
CERTIFICATE OF CORRECTION

PATENT NO. : 4,238,690

DATED : December 9, 1980

INVENTOR(S) : Patrick W. Clarke

It is certified that error appears in the above—identified patent and that said Letters Patent is hereby corrected as shown below:

Column 5, line 29, "reverse" should read --reserve--.

Signed and Sealed this

Fifth Day of May 1981

[SEAL]

Attest:

RENE D. TEGTMEYER

Attesting Officer          Acting Commissioner of Patents and Trademarks